March 22, 1932.  H. H. BAILEY  1,850,091

ACTUATOR FOR SLIDING DOORS

Filed Dec. 13, 1929

INVENTOR
Henry H. Bailey
BY
ATTORNEY

Patented Mar. 22, 1932

1,850,091

UNITED STATES PATENT OFFICE

HENRY H. BAILEY, OF OKLAHOMA CITY, OKLAHOMA, ASSIGNOR TO MECHANICAL ROYALTIES CORPORATION, OF OKLAHOMA CITY, OKLAHOMA, A CORPORATION OF OKLAHOMA

ACTUATOR FOR SLIDING DOORS

Application filed December 13, 1929. Serial No. 413,778.

My invention relates to sliding doors of the type commonly employed for freight cars and other structures and has for its principal object to provide apparatus for facilitating opening and closing of such a door and for locking the door in any adjusted position.

In accomplishing this object, I have provided improved details of structure, the preferred form of which is illustrated in the accompanying drawings, wherein.

Figure 1:
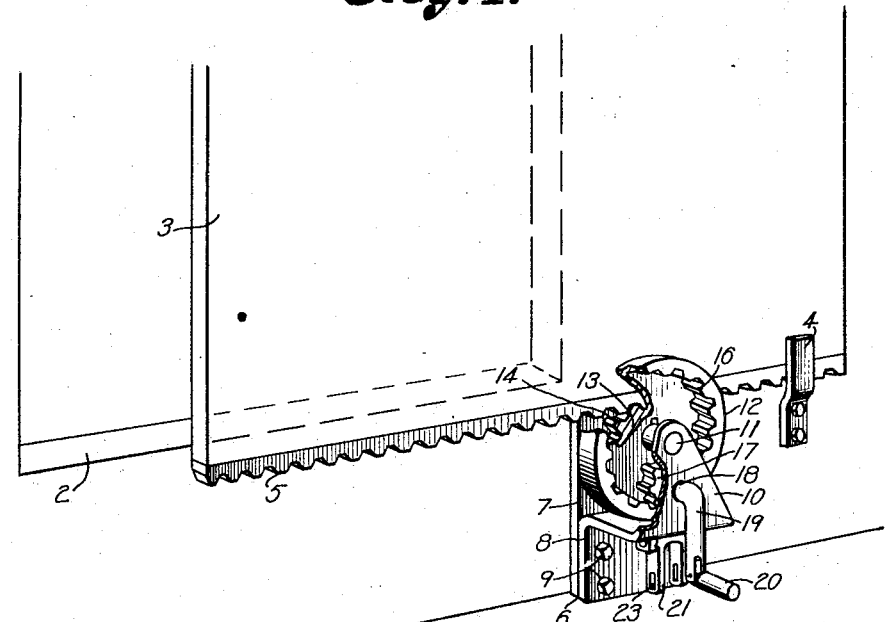
Fig. 1 is a perspective view of part of a structure such as a railway freight car, having a sliding door and equipped with a door actuator and lock embodying my invention.

Referring in detail to the drawings:

1 designates a housing structure which may be a freight car having a door opening 2, and 3 a door adapted for closing the opening, and which may be mounted on the car by the usual suspension track or by other means (not shown). 4 designates guides on the frame 1 for retaining the lower edge of the door in close relation to the side of the car or other structure having the opening 2.

The lower edge of the door 3 is provided with a rack 5 for a purpose which I will now describe.

Fixed to the frame 1, below and preferably at the side of a line extending from one edge of the opening 2, is a bracket 6 including a plate 7 attached to the frame 1 and an angle strip 8 attached to the frame 1, preferably by bolts 9 that extend through the plate 7 into the frame and including an upstanding wing 10 spaced from the plate 7, and forming an outwardly opening recess therewith.

Journaled in the wing 10 and in the plate 7 is a shaft 11 and rigidly mounted on said shaft within the recess between the wing and plate is a wheel 12, having a hub 13 on its inner face carrying a pinion 14, which is keyed to the hub by spline 15, and meshes with the rack 5 which, together with part of the lower edge of the door, projects into the recess between the wheel and mounting plate.

The outer face of the wheel 12 is provided with an internal gear 16 and meshing with the gear is a pinion 17 fixed on the shaft member 18 of a crank 19, which is journaled in the wing 10 of the bracket 6. The crank member is preferably provided with a handle 20, pivotally connected with the body of the crank member so that it can be swung at an angle to the crank member when the actuator is to be operated.

21 designates a yoke pivotally mounted on ears 22, depending from the bracket member 8 and having slots 23 in the ends of the yoke arms for receiving the hasp 24 of a padlock 25, or other sealing means, whereby the crank member may be locked to retain the door in any set position.

Figure 2:
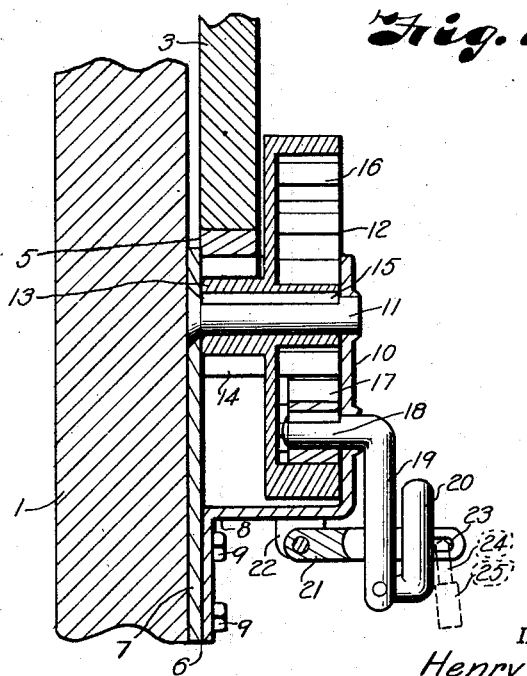
Fig. 2 is an enlarged central vertical section of a part of the door frame and of the door actuating and locking mechanism.

Assuming the parts to be constructed and assembled with a freight car or other housing structure equipped with a sliding door of ordinary construction, except for my improvements, the invention may be employed as follows:

First assuming that the sliding door is located over the door opening to close the latter; when the door is to be opened, the operator actuates the crank 19 to rotate the pinion 17 in the internal gear of the wheel 12, thereby causing the external gear or pinion 14 to rotate in the rack on the lower edge of the car door and move the door laterally to completely or partially expose the door opening. When the door is opened to the degree desired, the crank is turned to the perpendicular position illustrated in Fig. 2 of the drawings, and the keeper yoke is swung up or over the crank member and the padlock, or seal, applied to retain the crank member in such position and prevent its operation by unauthorized persons.

It is apparent that with an actuator of the character described, the door may be easily and quickly opened or closed, and when in a desired position such as entirely open, entirely closed, or partially opened, the door may be locked to prevent its further operation until it is unlocked by an authorized person having a key for that purpose.

It will also be noted from the drawings that a portion of the wheel 12 extends upwardly along one face of the door and beyond the lower edge of the door, and thus acts as a guide for and prevents lateral swinging of the door.

What I claim and desire to secure by Letters Patent is:

1. In combination with a door frame and a door slidable on the frame and provided with a rack on its lower edge, a wheel rotatably mounted on the frame having an external gear meshing with the rack and having an internal gear of greater diameter than said external gear and adapted to extend upwardly beyond the lower edge of said door, a pinion meshing with the internal gear, and means for actuating the pinion.

2. In combination with a door frame and a door slidable on the frame and provided with a rack, a bracket on the frame, a wheel rotatably mounted on the bracket having an external gear meshing with the rack and having an internal gear of greater diameter than said external gear and adapted to extend upwardly along one face of said door adjacent its lower edge for preventing swinging of said door, a crank journaled on the bracket, a pinion on said crank meshing with the internal gear, and a yoke pivotally mounted on the bracket and cooperative with the crank to lock the door in set position.

3. In combination with a door frame and a door slidable on the frame and provided with a rack on its lower edge, a bracket on the frame comprising a plate and an angle strip including a wing portion spaced from said plate, a shaft journalled in said plate and wing portion, a gear unit fixed to said shaft comprising an external gear meshing with said rack and an internal gear of greater diameter than said external gear, said gear adapted to project beyond the lower edge of the door for guiding the same, a crank journalled in the wing portion, and a pinion fixed to the inner end of said crank and meshing with the internal gear.

4. In combination with a door frame and a door slidable on the frame and provided with a rack on its lower edge, a bracket on the frame comprising a plate and an angle strip including a wing portion spaced from said plate, a shaft journalled in said plate and wing portion, a gear unit fixed to said shaft comprising an external gear meshing with said rack and an internal gear of greater diameter than said external gear adapted to extend upwardly along one face of the door adjacent its lower edge, a crank journalled in the wing portion, a pinion fixed to the inner end of said crank and meshing with the internal gear, and a yoke pivotally mounted on the bracket and cooperative with the crank to lock the door in set position.

In testimony whereof I affix my signature.

HENRY H. BAILEY.